(12) United States Patent
Vaschillo et al.

(10) Patent No.: US 7,788,144 B2
(45) Date of Patent: Aug. 31, 2010

(54) SYSTEM AND METHOD FOR STORING AND PRESENTING IMAGES AND RELATED ITEMS TO A USER

(75) Inventors: Alexander Vaschillo, Redmond, WA (US); Bradley P. Gibson, Seattle, WA (US); Christopher A. Evans, Sammamish, WA (US); John C. Platt, Redmond, WA (US); Nathaniel H. Ballou, Kirkland, WA (US); Paul S. Hellyar, Redmond, WA (US); Scott E. Dart, Lynnwood, WA (US); Steve C. Glenner, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1407 days.

(21) Appl. No.: 10/931,889

(22) Filed: Sep. 1, 2004

(65) Prior Publication Data

US 2006/0047584 A1  Mar. 2, 2006

(51) Int. Cl.
G06F 17/30 (2006.01)
G03F 3/10 (2006.01)
(52) U.S. Cl. .......................................... 705/27; 396/639
(58) Field of Classification Search .................... 705/27
See application file for complete search history.

(56) References Cited

U.S. PATENT DOCUMENTS

| | | | | |
|---|---|---|---|---|
| 6,017,157 A | * | 1/2000 | Garfinkle et al. | 396/639 |
| 6,141,658 A | * | 10/2000 | Mehr et al. | 707/7 |
| 6,292,575 B1 | * | 9/2001 | Bortolussi et al. | 382/118 |
| 6,301,586 B1 | * | 10/2001 | Yang et al. | 707/104.1 |
| 6,307,568 B1 | * | 10/2001 | Rom | 345/629 |
| 6,868,415 B2 | * | 3/2005 | Kageyama et al. | 707/6 |
| 2002/0092029 A1 | * | 7/2002 | Smith | 725/105 |
| 2004/0078299 A1 | * | 4/2004 | Down-Logan et al. | 705/27 |
| 2004/0181465 A1 | * | 9/2004 | Kan | 705/27 |
| 2004/0186792 A1 | * | 9/2004 | Sales et al. | 705/27 |
| 2004/0199435 A1 | * | 10/2004 | Abrams et al. | 705/27 |
| 2005/0234782 A1 | * | 10/2005 | Schackne et al. | 705/27 |
| 2008/0021953 A1 | * | 1/2008 | Gil | 709/203 |

OTHER PUBLICATIONS

James Gallagher, Knight Ridder Tribune Business News. Washington: Aug. 29, 2004. p. 1.*

* cited by examiner

Primary Examiner—Matthew S Gart
Assistant Examiner—Garcia Ade
(74) Attorney, Agent, or Firm—Shook Hardy & Bacon LLP

(57) ABSTRACT

A system and method for presenting images and related items to a user. A digital image from a data store is assessed, and a portion of the image is defined as a region of interest. Properties are associated with this defined region, and these properties are utilized to infer relationships between the region of interest and related items in the data store. Optionally, a user input indicating a desire to view related content may be received and such content may be presented to the user.

7 Claims, 10 Drawing Sheets

SYSTEM AND METHOD FOR STORING AND PRESENTING IMAGES AND RELATED ITEMS TO A USER

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present invention relates generally to the field of computer software. More particularly, the present invention relates to a system and method for storing and presenting items to a user.

BACKGROUND OF THE INVENTION

Providing users of computers with useful and understandable interfaces for navigating and interacting with content stored upon a computer has become increasingly complex as the information stored in computing environments has grown and diversified. Similarly, giving users of computers the ability to quickly find and display related pieces of information is a challenge that the computer industry has struggled with for many years. Today this problem is more salient then ever as increasing numbers of individuals utilize computers in their daily routines and as the types of information stored on a computer continues to diversify.

For example, users often utilize their computers to store and interact with a wide variety of digital images. Millions of families now use digital cameras to snap hundreds of images each year. These images are often stored on the computer and can be easily disseminated via the Internet and email.

Traditionally, as in Microsoft Corporation's WINDOWS® XP™ operating system, digital images and other files are stored on the computer within a data store in a hierarchical fashion organized with files of information or media stored within folders. These conventional operating systems include a shell utility that provides a user interface for viewing information about the computer. The shell typically includes a file system browser that enables users to navigate through the file system and locate and open files and folders. For example, Microsoft Corporation's WINDOWS® EXPLORER™ is a file system browser utility included with WINDOWS® XP™.

To interact with a specific type of content such as digital images, the shell or a computer application may provide an environment specially designed for that content. For example, =WINDOWS® XP™ provides enhanced viewing of digital images, and Apple Corporation's iPhoto™ is a commercially available application for presenting digital photos. These products may allow a user to associate properties with the digital images. Information such as the date taken and the subject matter of the photo may be stored along with the image, and, depending upon the platform, this data may be used for various operations such as indexing and searching. In a file system context, the information may be metadata placed in the data store along with the underlying image file.

While these presently available products provide useful techniques for the presentation and storage of digital images, they are limited in several important aspects. For instance, while properties may be associated with an image file, currently available systems do not allow such data to be associated with only a portion or a region of an image. For example, they do not provide metadata that identifies a person and where in the image that person is shown. Hence, the user must actually view the image to find particular subject matter.

Another limitation of conventional systems is a restricted ability to display items in a relational manner. Applications generally cannot access or display a variety of items in a data store, and typical shell browsers are operable only to display items in the hierarchical fashion in which they are stored—organized within files stored within folders. For example, if a user desires to view all the files stored on a computer pertaining to a certain subject, that user must first place all such files in the same folder. Because the shell has limited capacity to determine relationships between items, it is difficult for a user to view files in a relationship-driven context. Were a system able to present content in a relationship-driven context, a computer could utilize properties associated with image items to find other items with related subject matter. Similarly, for images having data describing subject matter depicted in a particular region, the computer could locate and display items related to this region's subject matter.

Accordingly, there is a need for improved techniques for defining properties associated with an image stored in a data store. There is also a need for improved capabilities for presenting items in a data store in a relationship-driven context.

SUMMARY OF THE INVENTION

The present invention meets the above needs and overcomes one or more deficiencies in the prior art by providing a system and method for storing and presenting images and related items to a user. In one aspect of the present invention, a computer implemented method is provided which presents related items from a data store to a user. A digital image from the data store is assessed, and a portion of the image is defined as a region of interest. Properties are associated with this defined region, and these properties are utilized to infer relationships between the region of interest and related items in the data store.

Another aspect of the present invention includes computer-readable media having instructions directed towards a method for navigation among items of content. The method displays a digital image to the user. At least a portion of the image is defined as a region of interest, and one or more properties are associated with the region. These properties may relate to the subject matter shown within the region. A user input indicating a desire to view content related to this shown subject matter is received. By utilizing the region of interest's properties, the method locates such related content and presents it to the user.

A further aspect of the present invention includes a computer-implemented method for storing an image in a data store. An image is stored in accordance with a storage schema that associates properties with a defined region of the image. According to one embodiment, at least one of the properties relates to a subject depicted within the defined region. The method then utilizes these properties to associate the image with content in the data store related to the depicted subject matter.

In yet another aspect of the present invention, a computer system for presenting items to a user is provided. The system includes a data store that contains items with associated relational information. This information allows relationships between items to be determined. At least one image with a defined region of interest resides in the data store, and the region of interest has associated relational information. The system further includes a shell for presenting the items to a user. The shell may be configured to utilize the relational information to display items in the data store which are related to a selected region of interest.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

I. Introduction

The subject matter of the present invention is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein and wherein.

The present invention provides an improved system and method for storing and displaying items stored on a computer to a user. An exemplary operating environment for the present invention is described below.

A. Exemplary Operating Environment

Figure 1:
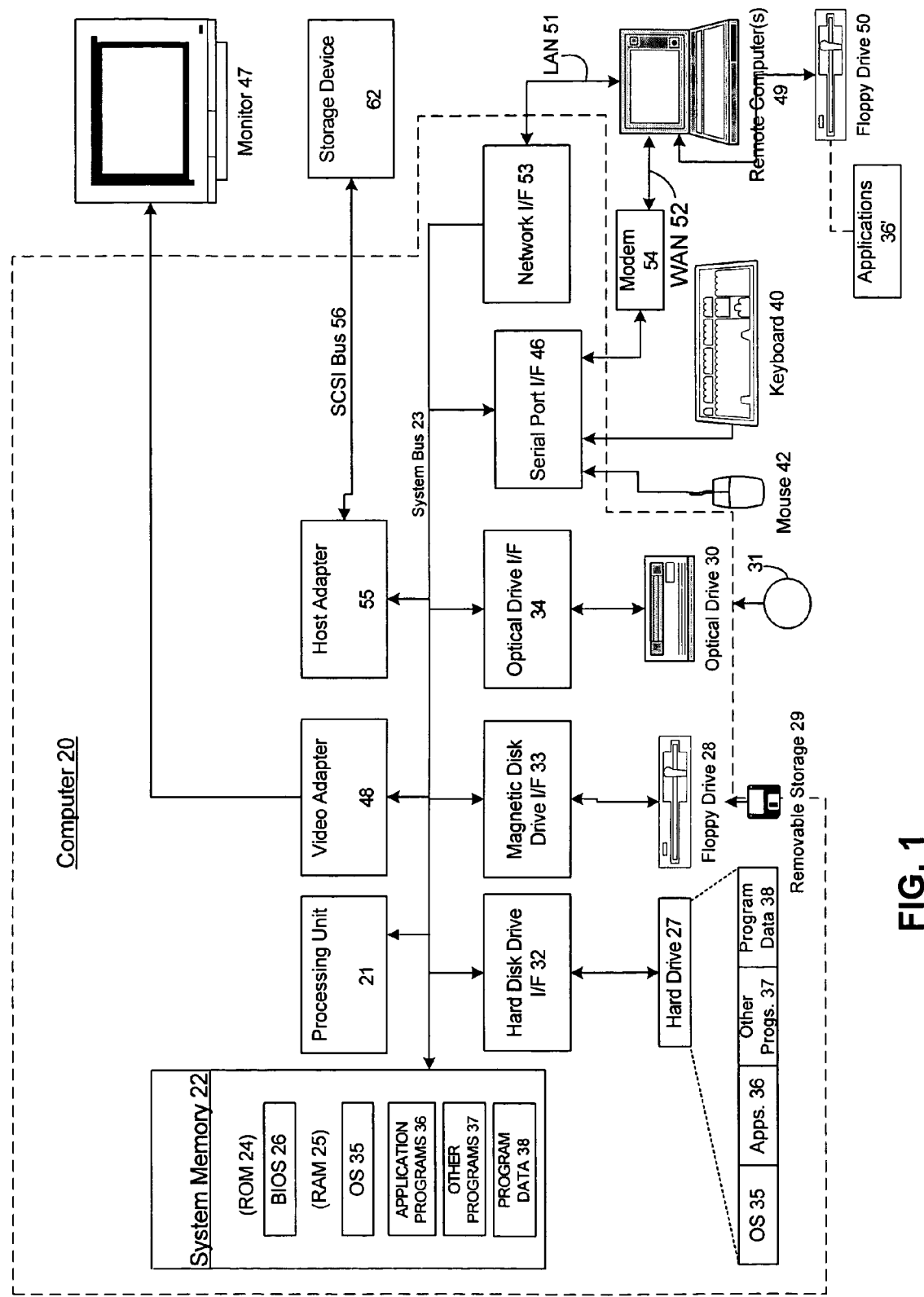
FIG. 1 is a block diagram of a computing system environment suitable for use in implementing the present invention.

Numerous embodiments of the present invention may execute on a computer. FIG. 1 and the following discussion is intended to provide a brief general description of a suitable computing environment in which the invention may be implemented. Although not required, various aspects of the invention may be described in the general context of computer executable instructions, such as program modules, being executed by a computer, such as a client workstation or a server. Generally, program modules include routines, programs, objects, components, data structures and the like that perform particular tasks or implement particular abstract data types. Moreover, the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment. Likewise, the exemplary environment may also include many types of monitoring devices such as heat sensors and security or fire alarm systems, and other sources of information.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown)

may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2A:
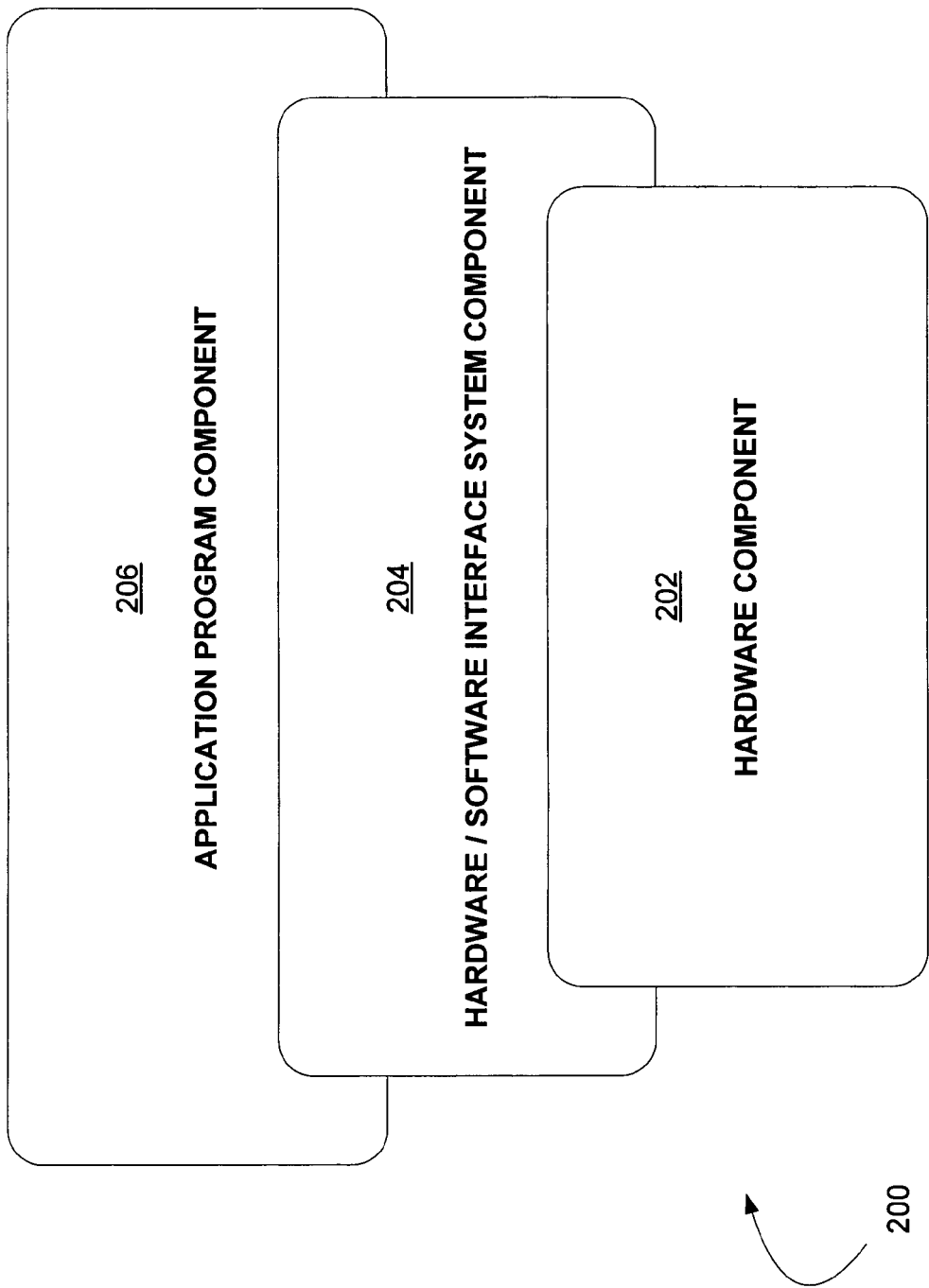
FIG. 2A is a block diagram illustrating a computer system divided into three component groups: the hardware component, the hardware/software interface system component, and the application programs component.

As illustrated in the block diagram of FIG. 2A, a computer system 200 can be roughly divided into three component groups: the hardware component 202, the hardware/software interface system component 204, and the applications programs component 206 (also referred to as the "user component" or "software component" in certain contexts herein).

In various embodiments of a computer system 200, and referring back to FIG. 1, the hardware component 202 may comprise the central processing unit (CPU) 21, the memory (both ROM 24 and RAM 25), the basic input/output system (BIOS) 26, and various input/output (I/O) devices such as a keyboard 40, a mouse 42, a monitor 47, and/or a printer (not shown), among other things. The hardware component 202 comprises the basic physical infrastructure for the computer system 200.

The applications programs component 206 comprises various software programs including but not limited to compilers, database systems, word processors, business programs, videogames, and so forth. Application programs provide the means by which computer resources are utilized to solve problems, provide solutions, and process data for various users (machines, other computer systems, and/or end-users).

The hardware/software interface system component 204 comprises (and, in some embodiments, may solely consist of) an operating system that itself comprises, in most cases, a shell and a kernel. An "operating system" (OS) is a special program that acts as an intermediary between application programs and computer hardware. The hardware/software interface system component 204 may also comprise a virtual machine manager (VMM), a Common Language Runtime (CLR) or its functional equivalent, a Java Virtual Machine (JVM) or its functional equivalent, or other such software components in the place of or in addition to the operating system in a computer system. The purpose of a hardware/software interface system is to provide an environment in which a user can execute application programs. The goal of any hardware/software interface system is to make the computer system convenient to use, as well as utilize the computer hardware in an efficient manner.

The hardware/software interface system is generally loaded into a computer system at startup and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application. The hardware/software interface system also manages the sharing of internal memory among multiple applications, and handles input and output to and from attached hardware devices such as hard disks, printers, and dial-up ports. The hardware/software interface system also sends messages to each application (and, in certain cases, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (simply referred to herein as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. A "shell browser" provides a user interface allowing a user to view and to interact with the hardware/software interface. In contrast to a shell, a kernel is a hardware/software interface system's innermost layer that interacts directly with the hardware components.

While it is envisioned that numerous embodiments of the present invention are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature B. Traditional File Based Storage In most computer systems today, "files" are units of storable information that may include the hardware/software interface system as well as application programs, data sets, and so forth. In all modern hardware/software interface systems (Windows, Unix, Linux, Mac OS, virtual machine systems, and so forth), files are the basic discrete (storable and retrievable) units of information (e.g., data, programs, and so forth) that can be manipulated by the hardware/software interface system. Groups of files are generally organized in "folders." In Microsoft Windows, the Macintosh OS, and other hardware/software interface systems, a folder is a collection of files that can be retrieved, moved, and otherwise manipulated as single units of information. These folders, in turn, are organized in a tree-based hierarchical arrangement called a "file system" (discussed in more detail herein below). In certain other hardware/software interface systems, such as DOS, z/OS and most Unix-based operating systems, the terms "directory" and/or "folder" are interchangeable, and early Apple computer systems (e.g., the Apple IIe) used the term "catalog" instead of file system; however, as used herein, all of these terms are deemed to be synonymous and interchangeable and are intended to further include all other equivalent terms for and references to hierarchical information storage structures and their folder and file components.

Figure 2B:
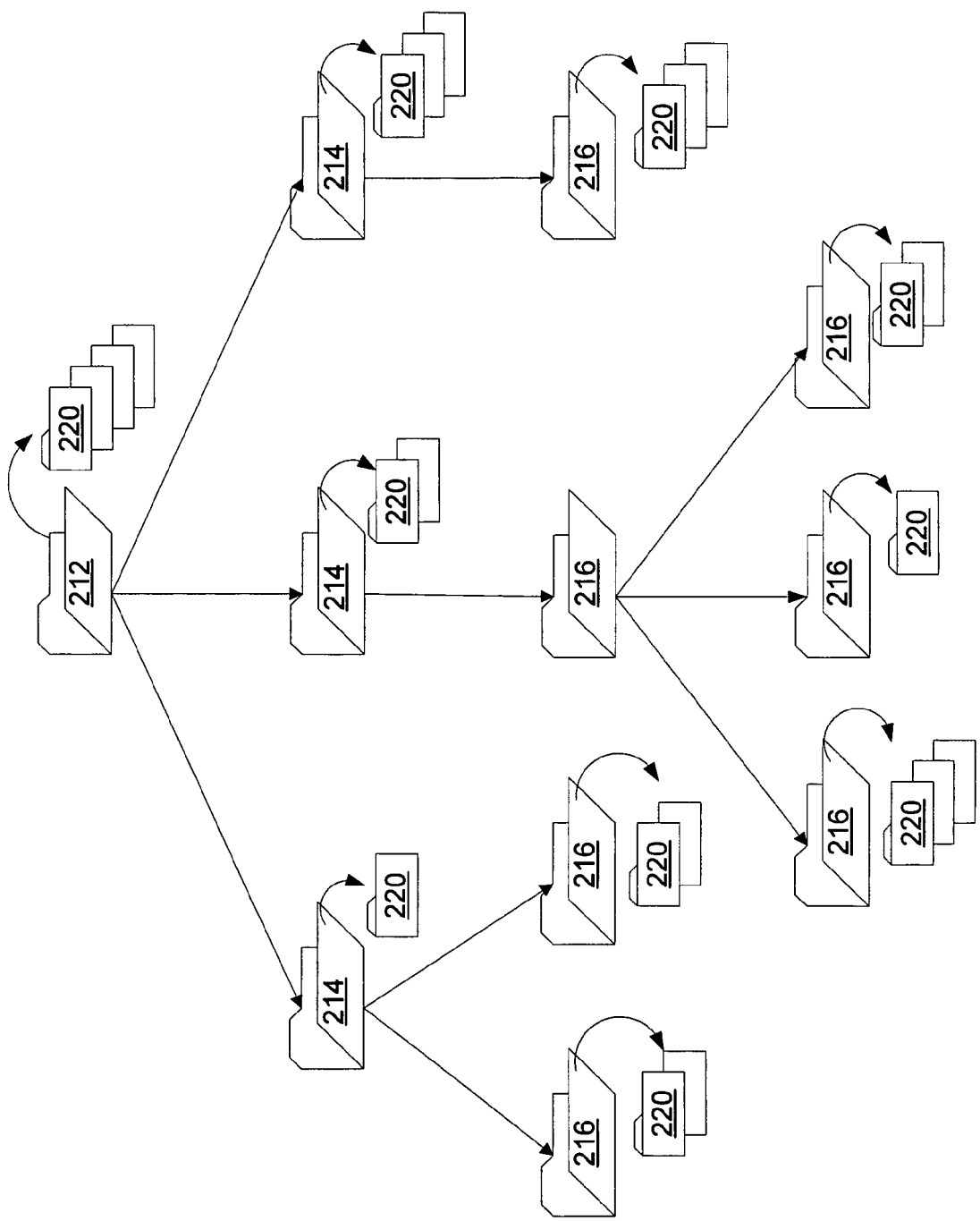
FIG. 2B illustrates the traditional tree-based hierarchical structure for files grouped in folders in a directory in a file-based operating system.

Traditionally, a file system is a tree-based hierarchical structure wherein files are grouped into folders and folder, in turn, are arranged according to relative nodal locations that comprise the directory tree. For example, as illustrated in FIG. 2B, a DOS-based file system base folder (or "root directory") 212 may comprise a plurality of folders 214, each of which may further comprise additional folders (as "subfolders" of that particular folder) 216, and each of these may also comprise additional folders ad infinitum. Each of these folders may have one or more files 220 although, at the hardware/software interface system level, the individual files in a folder have nothing in common other than their location in the tree hierarchy. Not surprisingly, this approach of organizing files into folder hierarchies indirectly reflects the physical organization of typical storage media used to store these files (e.g., hard disks, floppy disks, CD-ROMs, etc.).

In addition to the foregoing, each folder is a container for its subfolders and its files—that is, each folder owns its subfolders and files. For example, when a folder is deleted by the hardware/software interface system, that folder's subfolders and files are also deleted (which, in the case of each subfolder, further includes its own subfolders and files recursively). Likewise, each file is generally owned by only one folder and, although a file can be copied and the copy located in a different folder, a copy of a file is itself a distinct and separate unit that has no direct connection to the original (e.g., changes to the original file are not mirrored in the copy file at the hardware/software interface system level). In this regard, files and folders are therefore characteristically "physical" in nature because folders are the treated like physical containers, and files are treated as discrete and separate physical elements inside these containers.

II. Nontraditional Data Stored

The storage platform utilized by the present invention may extend beyond the kinds of existing file systems discussed above. For example, a data store designed to store all types of data may be referred to as a universal data store. An example of a universal data store suitable for use with the present invention is described in the commonly owned, co-pending application "SYSTEM AND METHODS FOR REPRESENTING UNITS OF INFORMATION MANAGEABLE BY A HARDWARE/SOFTWARE INTERFACE SYSTEM BUT INDEPENDENT OF PHYSICAL REPRESENTATION", U.S. patent application Ser. No. 10/647,058 filed on Aug. 21, 2003, which is hereby incorporated by reference.

A. Storage Platform Overview

Figure 3:
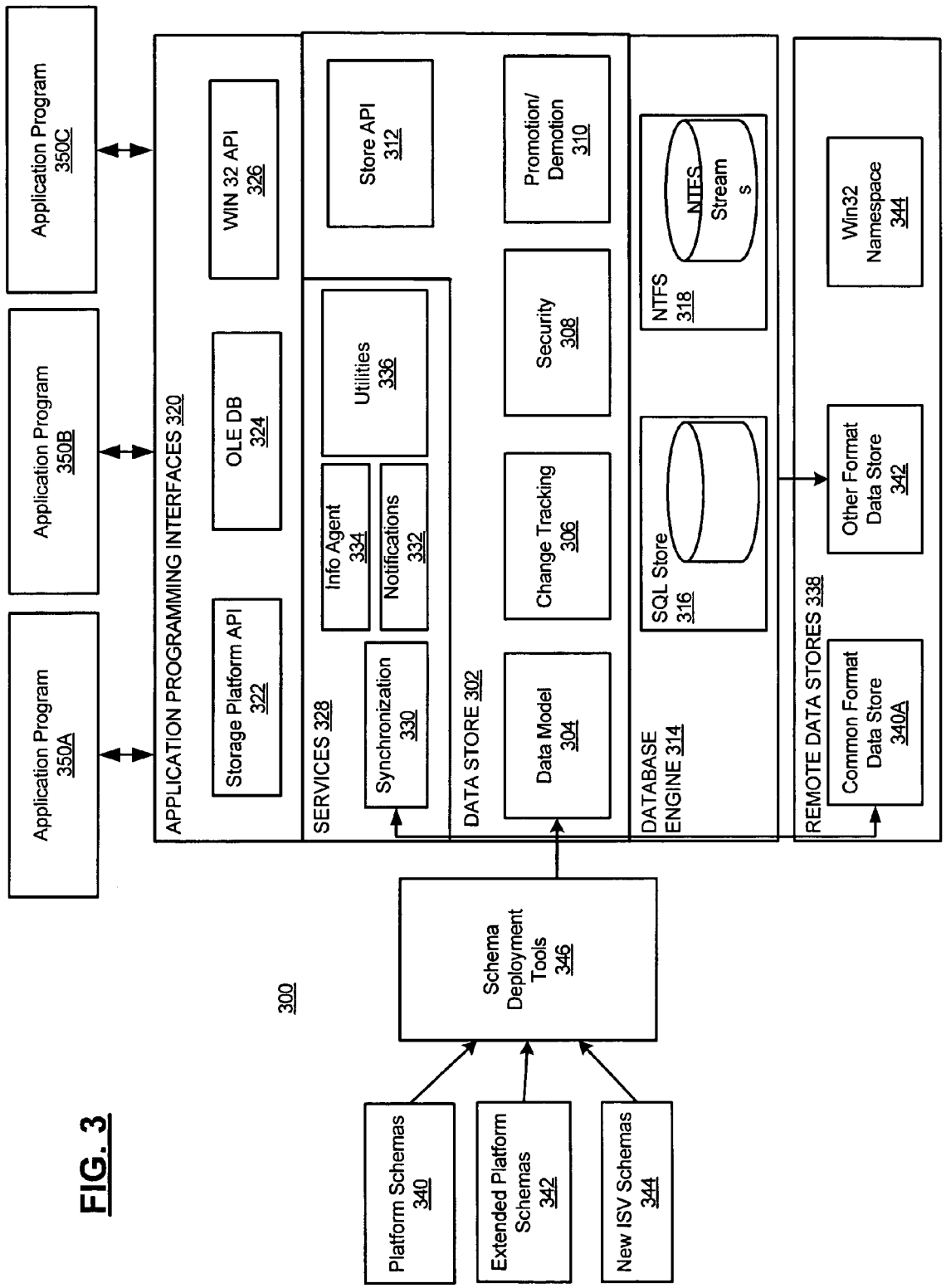
FIG. 3 is a block diagram illustrating a storage platform in accordance with the present invention.

Referring to FIG. 3, a storage platform 300 in accordance with the present invention comprises a universal data store 302 implemented on a database engine 314. In one embodiment, the database engine 314 is a relational database engine with object relational extensions. In one embodiment, the relational database engine 314 is the Microsoft SQL Server relational database engine.

The universal data store 302 implements a data model 304 that supports the organization, searching, sharing, synchronization, and security of data. Specific types of data are described in schemas, such as schemas 340, and the storage platform 300 provides tools 346 for deploying those schemas as well as for extending those schemas, as described more fully below.

A change tracking mechanism 306 implemented within the universal data store 302 provides the ability track changes to the data store. The universal data store 302 also provides security capabilities 308 and a promotion/demotion capability 310. The universal data store 302 also provides a set of application programming interfaces 312 to expose the capabilities of the universal data store 302 to other storage platform components and application programs (e.g., application programs 350A, 350B, and 350C) that utilize the storage platform.

The storage platform of the present invention still further includes application programming interfaces (API) 322, which enable application programs, such as application programs 350A, 350B, and 350C, to access all of the foregoing capabilities of the storage platform and to access the data described in the schemas. The storage platform API 322 may be used by application programs in combination with other APIs, such as the OLE DB API 324 and the Microsoft Windows Win32 API 326.

The storage platform 300 of the present invention may provide a variety of services 328 to application programs, including a synchronization service 330 that facilitates the sharing of data among users or systems. For example, the synchronization service 330 may enable interoperability with other data stores 340A having the same format as data store 302, as well as access to data stores 342 having other formats. The storage platform 300 also provides file system capabilities that allow interoperability of the universal data store 302 with existing file systems, such as the Windows NTFS files system 318.

In at least some embodiments, the storage platform 300 may also provide application programs with additional capabilities for enabling data to be acted upon and for enabling interaction with other systems. These capabilities may be embodied in the form of additional services 328, such as an Info Agent service 334 and a notification service 332, as well as in the form of other utilities 336.

In at least some embodiments, the storage platform is embodied in, or forms an integral part of, the hardware/software interface system of a computer system. For example, and without limitation, the storage platform of the present invention may be embodied in, or form an integral part of, an operating system, a virtual machine manager (VMM), a Common Language Runtime (CLR) or its functional equivalent, or a Java Virtual Machine (JVM) or its functional equivalent.

Through its common storage foundation, and schematized data, the storage platform 300 enables more efficient application development for consumers, knowledge workers and enterprises. It offers a rich and extensible programming surface area that not only makes available the capabilities inherent in its data model, but also embraces and extends existing file system and database access methods.

B. The Data Model

The universal data store 302 of the storage platform 300 implements a data model that supports the organization, searching, sharing, synchronization, and security of data that resides in the store. In the data model of the present invention, the fundamental unit of storage information may be referred to as an item. The data model provides a mechanism for declaring items and item extensions and for establishing relationships between items and for organizing items in folders and in categories.

In one embodiment of the present invention, the data model relies on two primitive mechanisms, Types and Relationships. Types are structures that provide a format which governs the form of an instance of the Type. The format is expressed as a set of Properties. A Property is a name for a value or set of values of a given Type. For example, a USPostalAddress type might have the properties Street, City, Zip, State. Properties may be required or optional.

Relationships can be declared and represent a mapping between the sets of instances of two types. For example, there may be a Relationship declared between the Person Type and the Location Type called LivesAt which defines the people living at different locations. The Relationship has a name and two endpoints, namely a source endpoint and a target endpoint. Relationships may also have an ordered set of properties. Both the Source and Target endpoints have a Name and a Type. For example the LivesAt Relationship has a Source called Occupant of Type Person and a Target called Dwelling of Type Location and in addition has properties StartDate and EndDate indicating the period of time for which the occupant lived at the dwelling. Note that a Person may live at multiple dwellings over time and a dwelling may have multiple occupants so the most likely place to put the StartDate and EndDate information is on the relationship itself.

Relationships define a mapping between instances that is constrained by the types given as the endpoint types. For example the LivesAt relationship cannot be a relationship in which an Automobile is the Occupant because an Automobile is not a Person.

1. Items

As mentioned above, the fundamental unit of storage information in a data store may be referred to as an item. An item is a unit of storable information that, unlike a simple file, is an object having a basic set of properties that are commonly supported across all objects exposed to an end-user or application program by the storage platform.

The universal data schema provides a foundation that establishes a conceptual framework for creating and organizing items and properties. The universal data schema defines certain special types of items and properties, and the features of these special foundational types from which subtypes can be further derived. The use of this universal data schema allows a programmer to conceptually distinguish items (and their respective types) from properties (and their respective types). Moreover, the universal data schema sets forth the foundational set of properties that all items may possess as all items (and their corresponding item Types) are derived from this foundational item in the universal data schema (and its corresponding item Type). By storing each item according to this universal data schema, a shell browser is able to interpret and present each item in the data store along with its basic properties to the user. An example of a universal data schema suitable for use with the present invention is described in the commonly owned, co-pending application "SYSTEM AND METHODS FOR REPRESENTING UNITS OF INFORMATION MANAGEABLE BY A HARDWARE/SOFTWARE INTERFACE SYSTEM BUT INDEPENDENT OF PHYSICAL REPRESENTATION", U.S. patent application Ser. No. 10/647,058 filed on Aug. 21, 2003, which is hereby incorporated by reference.

Items also have properties and relationships that are commonly supported across all item types including features that allow new properties and relationships to be introduced. Those skilled in the art will recognize that this property and relationship data may be referred to as metadata associated with an item.

Items are the objects for common operations such as copy, delete, move, open, print, backup, restore, replicate, and so forth. Items are the units that can be stored and retrieved, and all forms of storable information manipulated by the storage platform exist as items, properties of items, or relationships between items, each of which is discussed in greater detail herein below.

Items are intended to represent real-world and readily-understandable units of data like Contacts, People, Services, Locations, Documents (of all various sorts), and so on.

Items are stand-alone objects; thus, if you delete an item, all of the item's properties are also deleted. Similarly, when retrieving an item, what is received is the item and all of its properties contained in the item's metadata. Certain embodiments of the present invention may enable one to request a subset of properties when retrieving a specific item; however, the default for many such embodiments is to provide the item with all of its immediate and inherited properties when retrieved. Moreover, the properties of items can also be extended by adding new properties to the existing properties of that item's type. These "extensions" are thereafter bona fide properties of the item and subtypes of that item type may automatically include the extension properties. The extensions may also be referred to as metadata associated with a file.

2. Item Folders and Categories

Groups of items can are organized into special items called item Folders (which are not to be confused with file folders). Unlike in most file systems, however, an item can belong to more than one item Folder, such that when an item is accessed in one item Folder and revised, this revised item can then be accessed directly from another item folder. In essence, although access to an item may occur from different item Folders, what is actually being accessed is in fact the very same item. However, an item Folder does not necessarily own all of its member items, or may simply co-own items in conjunction with other folders, such that the deletion of an item Folder does not necessarily result in the deletion of the item.

Items may also belong to Categories based on common described characteristic such as (a) an item Type (or Types), (b) a specific immediate or inherited property (or properties), or (c) a specific value (or values) corresponding to an item property. For example, an item comprising specific properties for personal contact information might automatically belong to a Contact Category, and any item having contact information properties would likewise automatically belong to this Category. Likewise, any item having a location property with a value of "New York City" might automatically belong to a NewYorkCity Category.

Categories are conceptually different form item Folders in that, whereas item Folders may comprise items that are not interrelated (i.e., without a common described characteristic), each item in a Category has a common type, property, or value (a "commonality") that is described for that Category, and it is this commonality that forms the basis for its relationship to and among the other items in the Category. Moreover, whereas an item's membership in a particular Folder is not compulsory based on any particular aspect of that item, for certain embodiments all items having a commonality categorically related to a Category might automatically become a member of the Category at the hardware/software interface system level. Conceptually, Categories can also be thought of as virtual item Folders whose membership is based on the results of a specific query (such as in the context of a database), and items that meet the conditions of this query (defined by the commonalities of the Category) would thus comprise the Category's membership.

Figure 4:
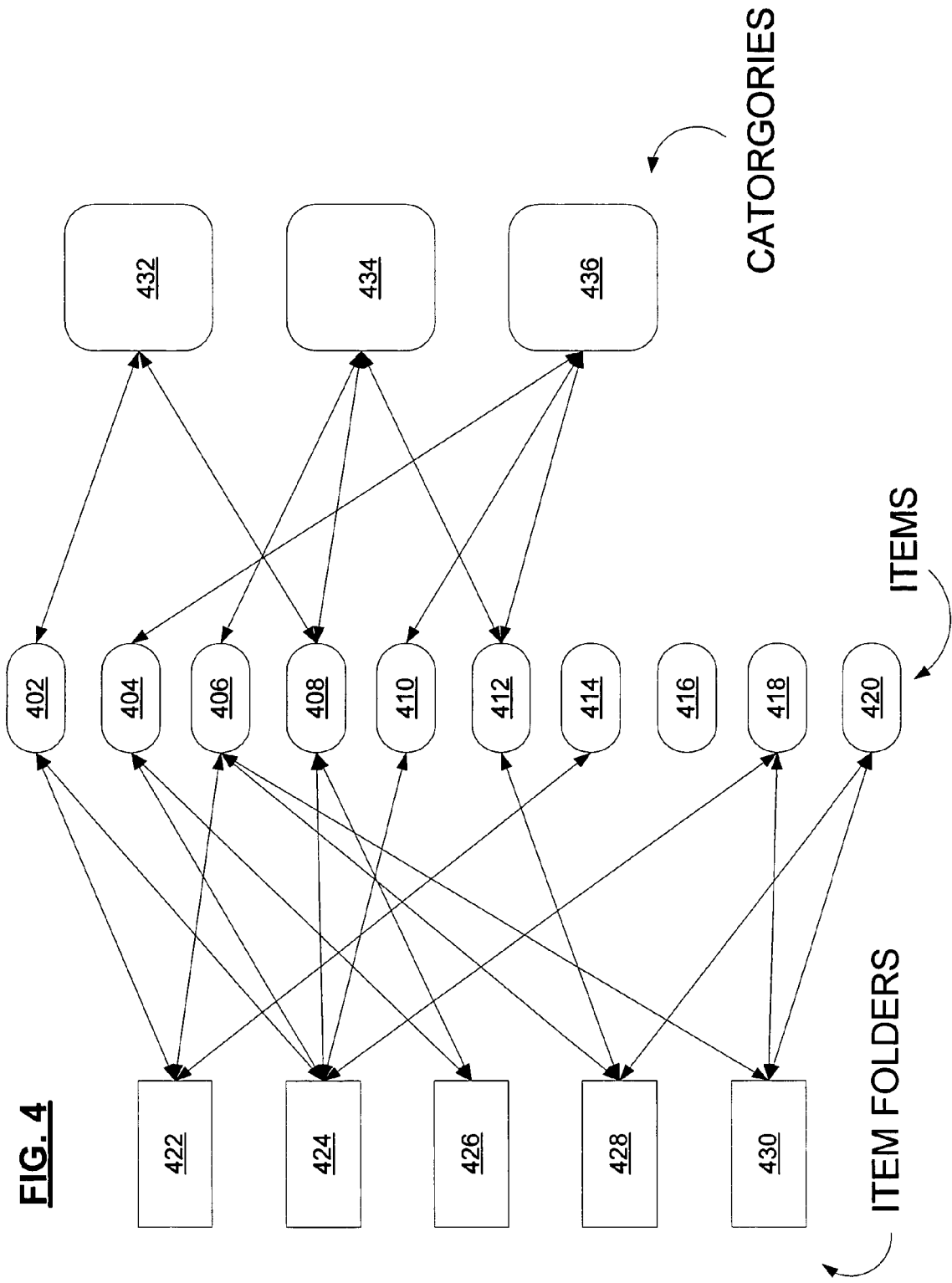
FIG. 4 illustrates the structural relationship between Items, Item Folders, and Categories in various embodiments of the present invention.

FIG. 4 illustrates the structural relationship between items, item Folders, and Categories in various embodiments of the present invention. A plurality of items 402, 404, 406, 408, 410, 412, 414, 416, 418, and 420 are members of various item Folders 422, 424, 426, 428, and 430. Some items may belong to more than one item Folder, e.g., item 402 belongs to item Folders 422 and 424. Some items, e.g., items 402, 404, 406, 408, 410, and 412 are also members of one or more Categories 432, 434, and 436, while other times, e.g., items 414, 416, 418, and 420, may belong to no Categories (although this is largely unlikely in certain embodiments where the possession of any property automatically implies membership in a Category, and thus an item would have to be completely featureless in order not to be a member of any category in such an embodiment). In contrast to the hierarchical structure of folders, both Categories and item Folders have structures more akin to directed graphs as shown. In any event, the items, item Folders, and Categories are all items (albeit of different item Types).

In contrast to files, folders, and directories, the items, item Folders, and Categories of the present invention are not characteristically "physical" in nature because they do not have conceptual equivalents of physical containers, and therefore items may exist in more than one such location. The ability for items to exist in more than one item Folder location as well as being organized into Categories provides an enhanced and enriched degree of data manipulation and storage structure capabilities at the hardware/software interface level, beyond that currently available in the art.

3. Relationships

Items may also contain relational information which allows relationships between two or more items to be determined. Relationships are binary relationships where one item is designated as source and the other item as target. The source item and the target item are related by the relationship. Relationships may be classified into Containment relationships and Reference relationships. The containment relationships control the life-time of the target items, while the reference relationships do not provide any life-time management semantics.

The Containment relationship types are further classified into Holding and Embedding relationships. A holding relationship controls the life-time of the target through a reference counting mechanism. Holding relationships do not contain their targets but control the life-time of the targets. When all holding relationships to an item are removed, the item is deleted. The embedding relationships enable modeling of compound items and can be thought of as exclusive holding relationships. An item can be a target of one or more holding relationships, but an item can be target of exactly one embedding relationship. An item that is a target of an embedding relationship cannot be a target of any other holding or embedding relationships. Embedded relationships contain their targets and control life-time of the targets. Those skilled in the art will recognize that a single target can be in at most one embedded relationship, while a single target can be in multiple holding relationships.

Reference relationships do not control the lifetime of the target item. They may be dangling if the target item does not exist. Reference relationships can be used to model references to items anywhere in the global item name space (i.e. including remote data stores).

Fetching an item does not automatically fetch its relationships. Applications or the shell must explicitly request the relationships of an item. In addition, modifying a relationship does not modify the source or the target item. Similarly, adding a relationship does not affect the source/target item. Relationships between two items may be declared and stored with an item or the shell or an application, and through utilization of the relational information, may determine the two items are related.

The Reference relationship does not control life-time of the item it references. Even more, the reference relationships do not guarantee the existence of the target, nor do they guarantee the type of the target as specified in the relationship declaration. This means that the Reference relationships can be dangling. Also, the reference relationship can reference items in other data stores. Reference relationships can be thought of as a concept similar to links in web pages.

In at least one embodiment, the storage platform of the present invention supports ordering of relationships. The ordering is achieved through a property named "Order." There is no uniqueness constraint on the Order field. The order of the relationships with the same "order" property value is not guaranteed. However it is guaranteed that they may be ordered after relationships with lower "order" value and before relationships with higher "order" field value. It should be noted that property "Order" is not in the base relationship definition. Rather, this is an extrinsic property which is stored as part of the relationship between source and target.

As previously mentioned, an item may be a member of an item Folder. In terms of Relationships, an item may have a relationship with an item Folder. In several embodiments of the present invention, certain relationships are represented by Relationships existing between the items.

4. Extensibility

Referring to FIG. 3, the storage platform is provided with an initial set of schemas 340, as described above. In addition, however, in at least some embodiments, the storage platform allows customers, including independent software vendor (ISVs), to create new schemas 344.

C. Database Engine

As mentioned above, the data store is implemented on a database engine. In one embodiment, the database engine comprises a relational database engine that implements the SQL query language, such as the Microsoft SQL Server engine, with object relational extensions. It is understood, however, that different database engines may be employed. Indeed, in addition to implementing the storage platform conceptual data model on a relational database engine, it can also be implemented on other types of databases, e.g. object-oriented and XML databases.

III. Determination of Related Items

By utilizing the foregoing data store, the present invention may display related items in the data store to the user. As described above, the items in a data store may include items having relational information or declared properties. An item may have declared relationships which elucidate the other items in the data store which share a relationship. For instance, an item containing an email address may declare a relationship to an item containing other contact information for the owner of the email address. The shell may utilize this declared relationship to present the other contact information upon a user request. The shell may also determine relationships by considering an item's declared properties. For example, a set of documents may be related if they share a common property; items with an extension "LegalItemExtension" may be related if a common value is stored as part of the extension. Such a relationship may be determined by a data query well known in the art.

Figure 5:
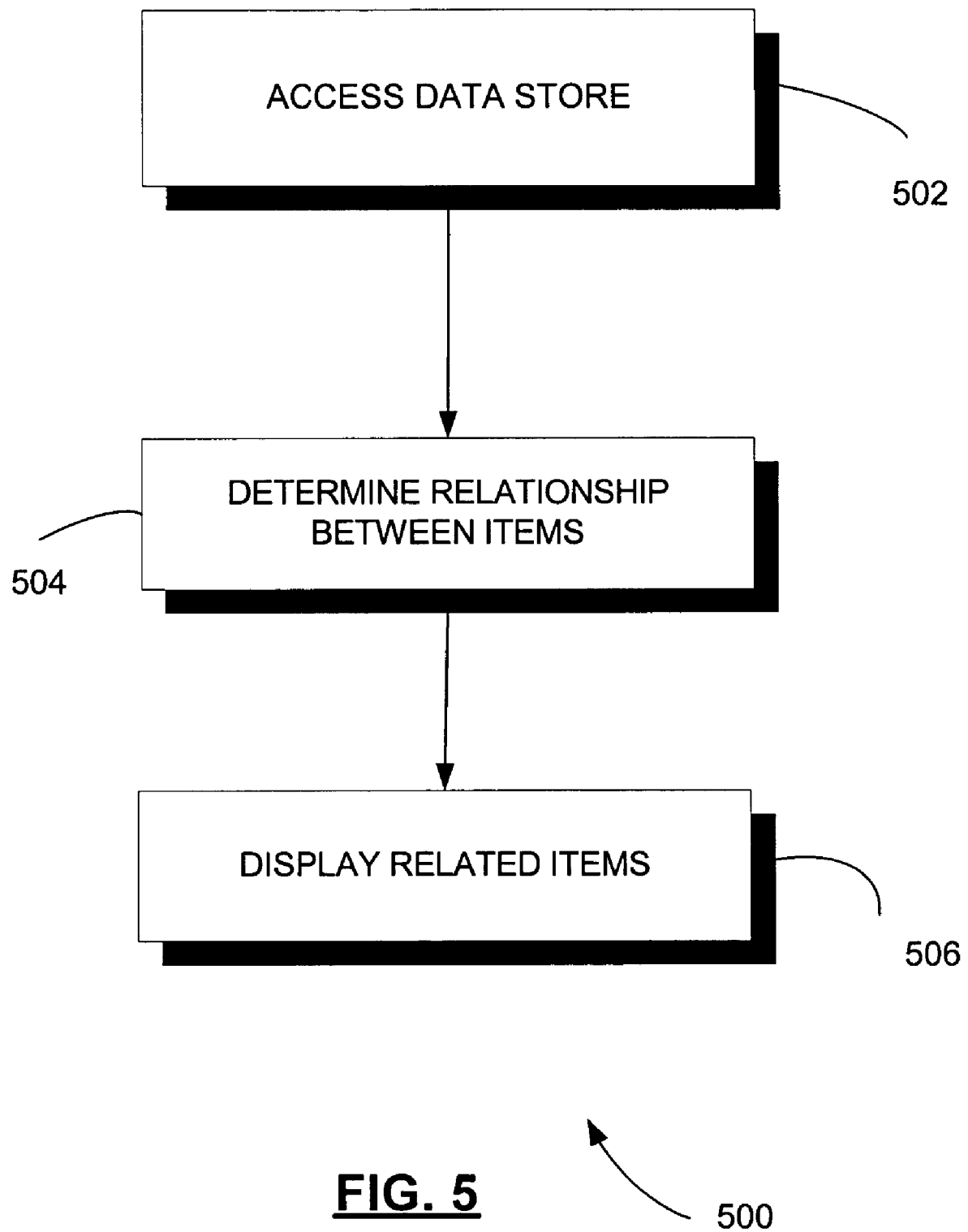
FIG. 5 is a flow diagram showing a method for presenting related items to a user in accordance with one embodiment of the present invention.

FIG. 5 displays a method 500 for presenting related items according to the present invention. At 502, the method 500 accesses the data store and, at 504, relationships between items in the data store are determined. As described above, such a determination utilizes the declared properties included with an item. This determination may be in response to a user input. For example, an item having a set of declared item characteristics may be displayed to a user. The item characteristic and relational information may be displayed with the item. The user may select one of the characteristics and input a request to see other items sharing the item characteristic. At 506, the method 500 presents related items to the user. Such presentation may include any display schema known in the art.

IV. Storage and Presentation of Image Items to a User

As previously mentioned the present invention relates to the storage and presentation of image items. Image items may include any data that has a graphical representation. For example, a bitmap, a JPEG or a digital photograph may be considered an image item. According to one embodiment of the present invention, all image items in a data store include a basic set of properties that are commonly supported across all objects exposed to an end-user or application program. As such, each image in the data store includes data indicating these basic properties stored in accordance with a data schema that is constant for each item. These properties may be thought of as metadata associated with the data.

Figure 6:
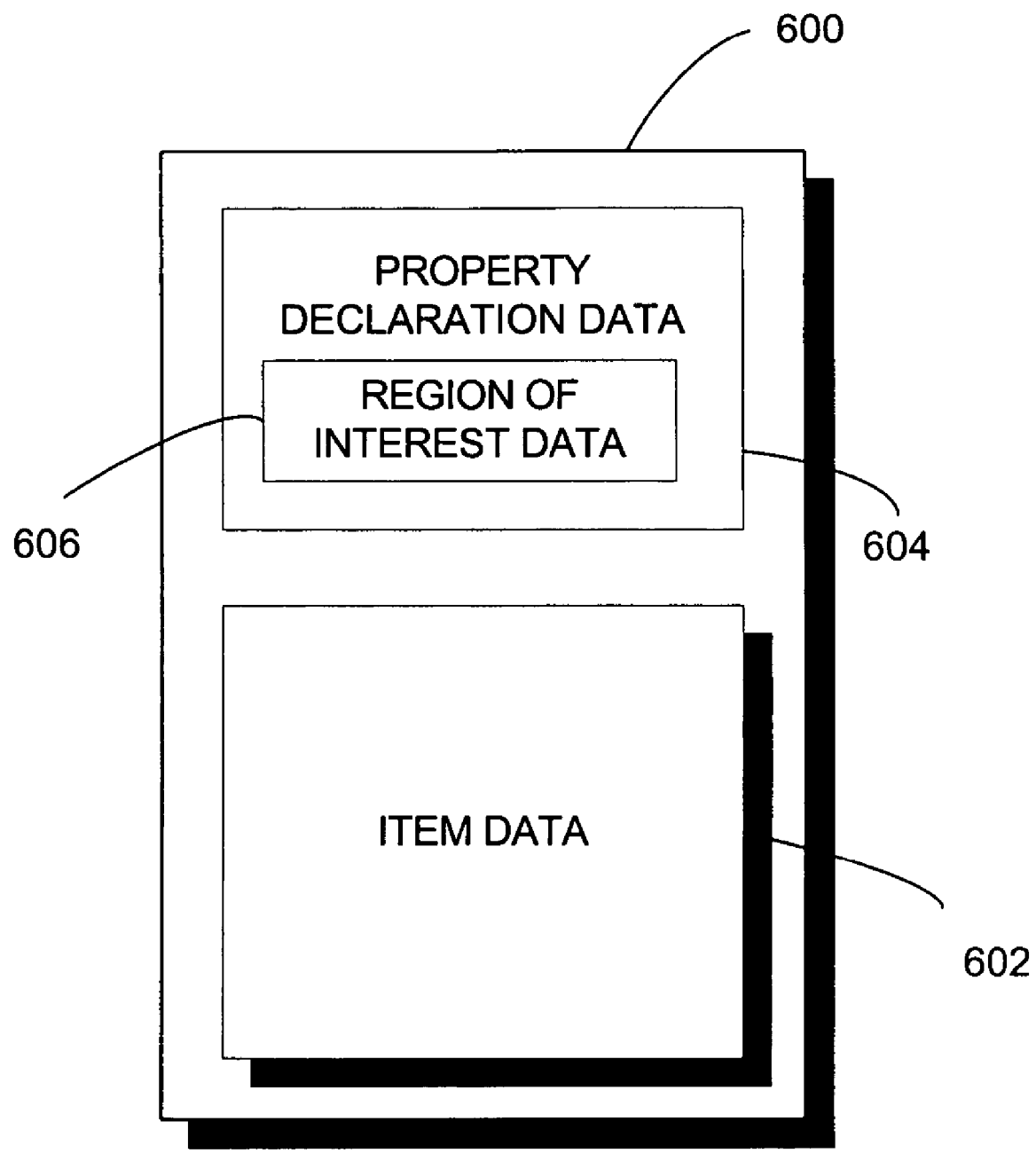
FIG. 6 is a diagram of the data contained within an item according to one embodiment of the present invention.

FIG. 6 displays an image item 600. According to one embodiment of present invention, the item 600 is stored in accordance with a data schema that includes a set of item data 602 and a set of metadata 604 including property declarations. The item data 602 may be any set of data appropriate for a digital image. For example, the item data 602 may be associated with a digital photograph. The property declarations metadata 604 may include at least the basic type declaration for an image type item.

A wide variety of data storage schemas may be utilized with metadata 604. Such schemes may include properties of file formats for presenting images (e.g. GIF, TIFF, JPEG, etc.), as well as properties that represent the semantic contents of an image (e.g. photographer, camera model, list of people on the image, etc.). Those skilled in the art will recognize that a wide variety of information may be appropriate for inclusion with a data storage schema. By providing such metadata 604, the images can be efficiently organized, stored, and searched. The metadata 604 may come from a variety of sources. For example, it may be manually input by a user, be downloaded from an external device, or be present in the image format. As previously discussed, this metadata 604 may provide the basis upon which relationships between the image item 600 and other items in the data store are determined.

Image item 600 may also include region of interest data 606, which defines one or more portions or regions of an image. For example, the region of a picture that shows a person's face may be defined as a region of interest. Those skilled in the art will recognize that identification of these regions may be made by a variety of conventions, such as defining the coordinates of the regions in pixels. The regions of interest may be selected manually by a user or may be defined based upon an algorithm. For example, facial detection software is well known in the art, and such techniques may be applied to image item 600 to define regions of interest associated with various faces depicted in the image. Facial detection software may include facial recognition capabilities.

Region of interest data 606 may also include information pertaining to the subject matter depicted within regions of an image. For example, the name of a shown person may be stored with the region of interest data 606. As with the previously described relational information/declared properties data, the region of interest data may be utilized to determine relationships between items. Furthermore, as will be more fully explained, declared relationships may also be associated with regions of interest, and those skilled in the art will recognize that a wide variety of data may be appropriate for inclusion with the data 606. For example, when facial recognition techniques are applied to an item, the name of the identified person and the level of confidence in a particular match may be included with the data 606.

Figure 7:
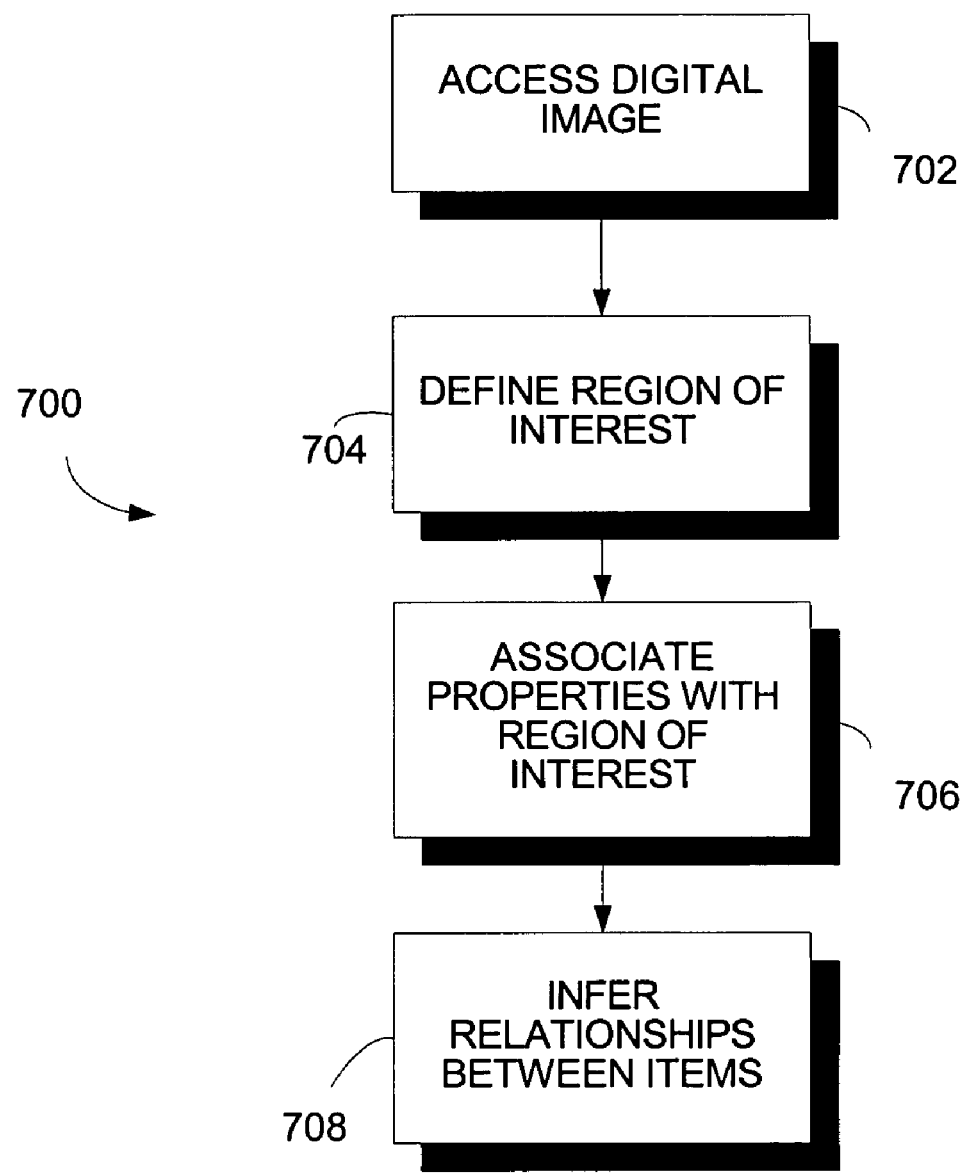
FIG. 7 is a flow diagram showing a method for presenting related items to a user in accordance with one embodiment of the present invention.

FIG. 7 displays a method 700 for presenting related items according to the present invention. At 702, a digital image is accessed. The digital image may be located in a data store and may be stored in accordance with any number of formats or schemes. At 704, one or more regions of interest are defined. These regions may be any portion of the image or may encompass the entire image. Furthermore, the regions may be defined manually or by a selection algorithm. For example, a user interface may be provided that allows a user to define the regions of interest. Once defined, data setting forth the region, such as pixel coordinates, may be stored along with the digital image. According to one embodiment, the region of interest is defined in a manner such that the subject matter displayed in the region of interest will persist despite manipulations to the image. For example, if a person's face is identified and then the image is rotated or resized, the region of interest will still point to the identified face. Further, if the geometry of the image is later modified in a simple way, such as by cropping or rotating, the region of interest can be updated to reflect the new coordinate system generated by the image modification.

At 706, one or more properties are associated with the region of interest. As previously discussed, these properties may relate to the subject matter depicted in the defined region. For example, if a building is shown in the region of interest, the property data may include the name and location of the building and may include references to other information in the data store pertaining to the building. The properties may be input by a user or may be added automatically by the computer. As will be understood by those skilled in the art, a wide variety of properties may be associated with the region of interest, and this data may be stored in accordance with a variety of schemes.

Once a region of interest has associated properties, at 708, this information may be utilized to infer relationships between the subject of the region and related items in the data store. For example, as discussed supra at III. DETERMINATION OF RELATED ITEMS, items in a data store may have declared properties upon which relationships may be stored or created. For instance, an image may include a person's face. The area of the image surrounding the face may be defined as a region of interest, and that person's name may be associated with the region. Related items may then be located. For instance, all documents authored by that person may be identified and presented to a user. According to one embodiment of the present invention, the shell determines the relationships by considering items' declared properties and by deeming items to be related if they share a common property. Such relationships may be determined by data queries well known in the art. Furthermore, relationships may be stored along with the region of interest data. For example, a person's contact information may be spread among various items in a data store. In order to present a complete set of contact information, the data store may include a number of stored relationships that tie these items together. To also tie the contact's image to the contact information, the region of interest data may link the image item to this stored relationship. Depending on the user interface, the user will then be able to navigate between the contact information and the person's image. Those skilled in the art will recognize that any number of related items may be associated with images having regions of interest.

Figure 8:
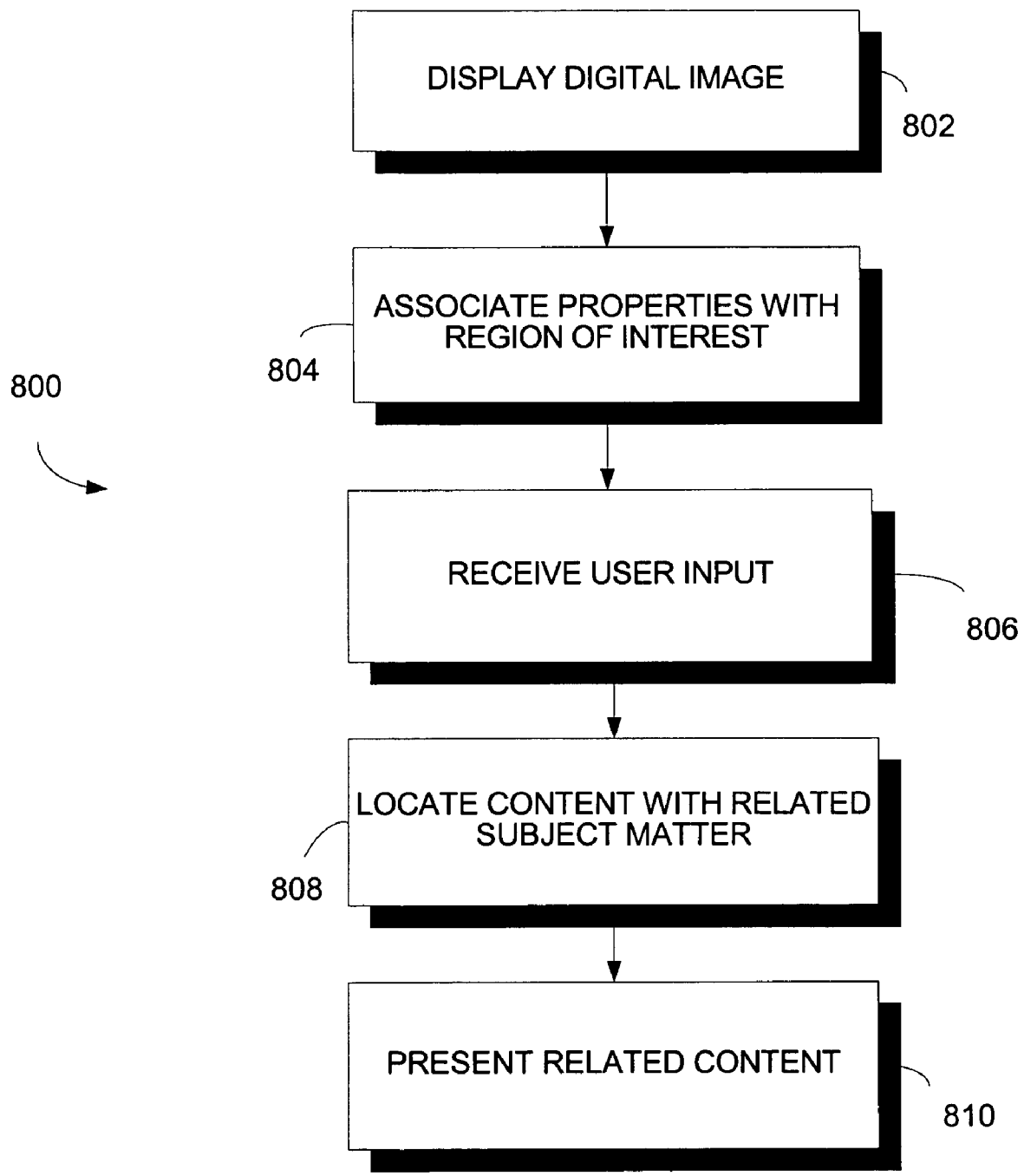
FIG. 8 is a flow diagram showing a method for navigating among content in accordance with one embodiment of the present invention.

FIG. 8 displays a method 800 for navigating among content according to the present invention. At 802, a digital image is displayed to a user. This presentation may be in accordance with any number of presentation techniques. One or more portions of the image may be defined as regions of interest. As previously explained, the regions of interest may encompass areas of the digital image having specific subject matter, and the regions may be selected by a user or by computer software. For example, the present invention may include a user interface that allows the user to select the portion of an image to be defined as a region of interest. A region of interest may also be defined externally, i.e., not by the user or by the computer's software. For example, a digital camera may allow for selective focusing on or definition of a region of interest. By allow such a region to be selected, the camera may determine the proper exposure settings, while providing the means to indicate the most important subject matter in a photograph. According to one embodiment of the present invention, the coordinates of the regions of interest are stored along with the image in the data store. Optionally, the regions of interest may be visible to the user as the digital image is displayed.

At 804, properties are associated with regions of interest. As will be understood by those skilled in the art, any number of properties may be appropriate for association with the regions, and, generally, these properties will be related to the subject matter shown within the regions of interest. For example, if a person's face were displayed within a region of interest, that person's name would be an appropriate property. As will be more fully discussed, the properties may be relational information upon which related content may be discovered. Similarly, the property data may specify or provide a link to other items in the data store pertaining to the subject matter shown within a region of interest.

A user input is received at 806 to indicate a desire to view content related to the subject matter depicted within a selected region of interest. This input may be expressed via any number of input devices upon any number of platforms. For example, a user may simply move a mouse pointer on a displayed image and click a mouse button when the pointer is hovering over a region of interest. As will be understood by those skilled in the art, any number of interfaces are acceptable for receiving a user input in accordance with the present invention.

At 808, the method 800 locates content relating to the subject matter depicted within the selected region of interest. To find this related content, the present invention utilizes the property information associated with the selected region. According to one embodiment of the present invention, the method 800 determines the relationships by considering items' declared properties and by deeming items related if they share a common property. Those skilled in the art will recognize that, by associating property metadata with an image item, a data store implementing relational database techniques will be able to locate other items in the data store with common properties. As previously explained, standard database queries may be utilized to find the related items, or the data store may contain known relationships between items.

At 810, the related content is presented to the user. Such presentation may be in accordance with any number of presentation techniques. Those skilled in the art will recognize that the method 800 provides various navigation abilities to a user; upon being presented an image with property data associated therewith, the user may use the image to browse among related content. For example, an image may have a region of interests depicting a known contact. The user may select to view the contact information for that person or may view any number of other items in the data store pertaining to that person. These other items may include the person's address, other images showing that person, or documents authored by that person. According to one embodiment, even if no known relationships are associated with the region of interest, the present invention will be able to infer such relationships via standard database queries. Those skilled in the art will further recognize that the present invention allows for bi-directional browsing of related content—a user may navigate from a piece of related content to the image or from the image to the related content. For example, a user viewing a document may request to see a picture of the document's author. The method 800 could locate such an image having a region of interest showing the author and may present that image to the user. Optionally, the region of interest depicting the author may be demarcated in this presentation. From this image presentation, the user may then choose to locate and display additional pieces of content related to the author or other subjects shown in the image.

Figure 9:
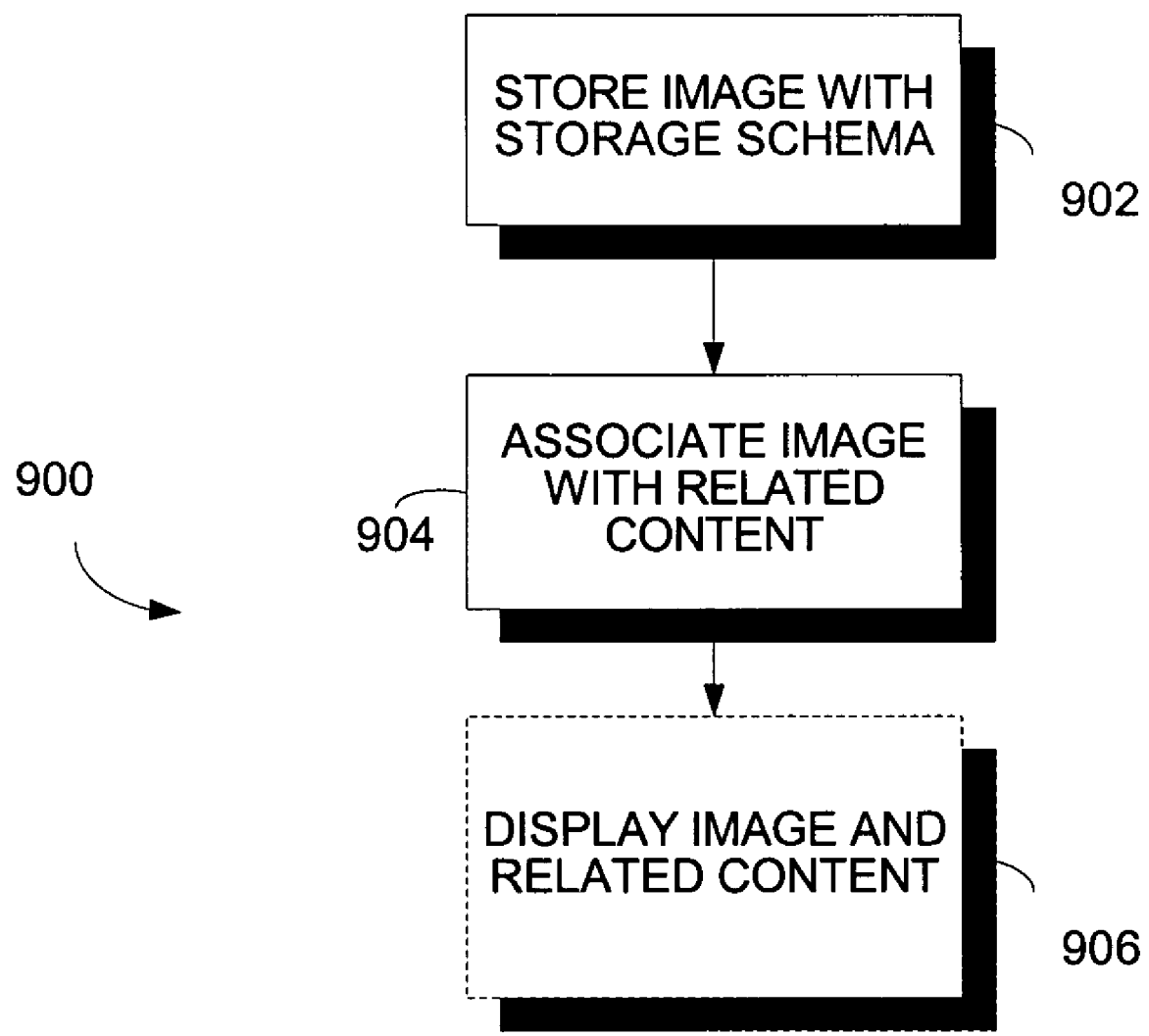
FIG. 9 is a flow diagram showing a method for locating items in a data store in accordance with one embodiment of the present invention.

FIG. 9 displays a method 900 for locating items in a data store having related subject matter. At 902, an image is stored in a data store in accordance with a storage schema that associates one or more properties with a defined region of the image. A storage schema in accordance with the present invention may be any convention upon which data is stored. For example, the previously discussed universal data schema provides a foundation that establishes a conceptual framework for creating and organizing items and properties. Further, a storage schema may dictate the manner in which additional properties or metadata may be associated with an item. One storage schema appropriate for the present invention allows properties to be associated with only a portion (or region) of an image item. These properties generally should relate to the subject depicted within the region. For example, the properties may provide a region display name, text to describe or identify the region. Those skilled in the art will recognize that a wide variety of storage schemes may be appropriate for the present invention and that any number of properties may be associated with a region of interest.

At 904, the method 900 utilizes a region's properties to associate the image with other content in the data store related to the subject depicted in the region of interest. Such related content may be located with reference to known or stored item relationships or by performing a query targeted at other items in the data store. According one embodiment of the present invention, the universal data store described above provides the storage platform, and the related content is located as discussed supra at III. DETERMINATION OF RELATED ITEMS. Optionally, at 906, the image and the related content are displayed to the user. For example, such presentation result from a user input indicating a desire to navigate from a piece of related content to the image or from the image to the related content.

Alternative embodiments and implementations of the present invention will become apparent to those skilled in the art to which it pertains upon review of the specification, including the drawing figures. Accordingly, the scope of the present invention is defined by the appended claims rather than the foregoing description.

The invention claimed is:

1. A computer-implemented method for presenting items from a data store to a user, the method comprising:

accessing a digital image residing in the data store of a storage platform of a computer;

defining at least a portion of said digital image as a region of interest;

associating one or more properties with said region of interest via a user interface that enables a user to input properties that relate to the subject matter depicted within said region of interest, wherein said input properties include a description of the subject matter depicted in said region of interest;

establishing at least one known relationship between said digital image and at least one or more items residing in said data store based on said input properties;

utilizing said known relationship to infer a relationship between said region of interest and one or more non-image items residing in the data store by utilizing a processor of said computer to query said data store for one or more non-image items having associated properties similar to said properties associated with said region of interest; and displaying said digital image and said one or more non-image items to the user in response to a user input indicating a desire to view one or more items related to said digital image.

2. The computer-implemented method of claim 1, wherein said digital image is a digital photograph.

3. The computer-implemented method of claim 1, wherein defining at least a portion of said digital image includes receiving a user input indicating said portion.

4. The computer-implemented method of claim 1, wherein defining at least a portion of said digital image includes utilizing one or more recognition algorithms.

5. The computer-implemented method of claim 4, wherein associating one or more properties with said region of interest includes utilizing data from said recognition algorithm.

6. The computer-implemented method of claim 1, wherein utilizing said properties to infer a relationship includes querying said data store for one or more items having associated properties similar to said properties associated with said region of interest.

7. A computer-implemented method for presenting items from a data store to a user, the method comprising:

accessing a digital image residing in the data store of a storage platform of a computer;

defining at least a portion of said digital image as a region of interest;

associating one or more properties with said region of interest via providing properties that relate to a subject matter depicted within said region of interest, wherein said subject matter depicted within the region of interest is a face of a person, a landmark or a location, or a focal region of a camera;

utilizing said properties to infer a relationship between said region of interest and one or more related items residing in the data store by utilizing a processor of said computer to query said data store for one or more items having associated properties similar to said properties associated with said region of interest, wherein said one or more related items include contact information or a document; and displaying said digital image and said one or more related items to the user.

* * * * *